Figure 1:
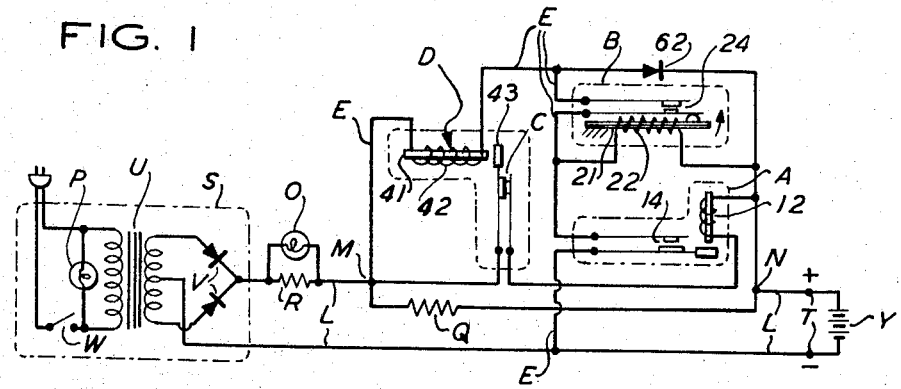

Nov. 21, 1967  A. W. BARRY  3,354,374
CONTROL SYSTEM FOR BATTERY CHARGING

Filed Dec. 27, 1965

INVENTOR
AUSTIN W. BARRY

BY ATTORNEY 3,354,374
CONTROL SYSTEM FOR BATTERY CHARGING
Austin W. Barry, Fanwood, N.J., assignor to G-V Controls Inc., Essex County, N.J., a corporation of New Jersey
Filed Dec. 27, 1965, Ser. No. 516,485
11 Claims. (Cl. 320—23)

This invention relates to a control system for battery charging, and more particularly to such a system of the type by which the charging of a battery is caused to occur at a fast-charge rate until the completion of fast charge and is thereafter continued at a substantially reduced rate. By way of example of the purpose of the final charging at the reduced rate there may be mentioned the provision of a "topping" charge, or of a trickle charge, but no unexpressed limitation in this respect is intended.

An object of the invention is to provide a control system of the type described which will occasion no load on the battery in the event of interruption of power from the source and will thus avoid discharge of the battery during the period of the interruption, yet will automatically re-establish charging at the fast-charge or reduced rate (as may be appropriate) at or briefly after the conclusion of the interruption.

Another object of the invention is to cause the establishment of charging at the appropriate rate in response to mere connection of the battery to the charger terminals, and to cause mere disconnection of the battery to result in the assumption by the charger of a condition appropriate to such an establishment upon the next succeeding connection of a battery.

An object of the invention is to achieve the above-stated objects with a control system which is nevertheless simple and inexpensive. A broad object is the provision of a generally improved control system. Allied and other objects will appear from the following brief and detailed descriptions of the invention and from the appended claims.

In a typical embodiment the invention combines, with a pair of terminals across which a battery may be connected and a two-conductor line through which fast-charge current may flow from a source to a battery present across those terminals, (a) a current-sensing relay having an input circuit connected in effective series relationship to the line and having an output switch operated in response to the flow of fast-charge current, and de-operated when reduced charge current flows, in the line,
(b) a charge-senseing relay having an input circuit connected, under the control of the output switch of the current-sensing relay, across the terminals when that output switch is operated and itself having an output switch operated, while its input circuit remains so connected, in response to a state of completion of fast charge of a battery present across the terminals,
(c) a charge-current-reducing switching device connected with the line,
(d) control means for the switching device, energizable to render and to maintain that device operative, and
(e) means, controlled by the output switches of both the sensing relays and rendered operative in response to a state of operation of both of them, for energizing the control means of (d) to render the switching device operative, that control means, when the charge-current-reducing switching device is and the energizing means of (e) is not operative, being connected in effective series relationship to the line for energization by a component of the reduced charge current thereby to maintain the switching device operative.

If while power is available from the source to the line a battery be connected across the terminals—or if while a battery is connected across the terminals the supply of power from source to line be initiated—fast-charge current will flow in the line to result in operation of the output switch of (a), in turn resulting in connection of the input circuit of (b) across the terminals. Either almost at once (in the case of a battery already rather well charged) or after a period sufficient to complete a fast charge (in other cases) the output switch of (b) is operated as well. Thereupon the energizing means of (e) is rendered operative to energize the control means of (d), thereby to render operative the charge-current-reducing switching device and thus to reduce the charge current. The energizing means of (e) will remain operative only until the de-operation of one of the (a) and (b) output switches, both of which will become de-operated as a result of the charge-current-reducing switching device being rendered operative—that of (a) because only reduced charge current then flows in the line, and that of (b) because its continued operation depends on the continued connection of the (b) input circuit across the terminals which connection in turn depends on the (a) output switch being operated. When the energizing means of (e) ceases to be operative the charge-current-reducing switching device will still be operative, and the energizable means of (d) then stands connected in effective series relationship to the line and is energized by a component of the reduced charge current—this energization maintaining that switching device operative.

The reduced charge current will flow until either the cessation of power from source to line or the removal of the battery from across the terminals. With no more than nominal delay after the first-to-occur of those events the control system will be fully restored to its normal quiescent condition of de-operation of the output switches of both (a) and (b) and of inoperativity of the charge-current-reducing switching device. While the control remains in that quiescent condition neither the input circuit of (a) nor that of (b) nor the control means of (d) can form a load on the battery (if the event has been the cessation of power from source to line) or on the source (if the event has been the removal of the battery)—the input circuit of (a) because it is in series relationship to the line, the input circuit of (b) because for its connection across the terminals it requires the operation of the (a) output switch, and the control means of (d) because of the de-operation of the (a) and (b) output switches. Upon any subsequent joint establishment of availability of power from the source and presence of a battery across the terminals, the flow of fast-charge current to the battery will be automatically initiated—and either promptly reduced or else continued until fast charge of the battery is completed (and then reduced), as the initial condition of the battery may require.

The invention having been thus briefly described, attention may be turned to a more detailed description.

Figure 2:
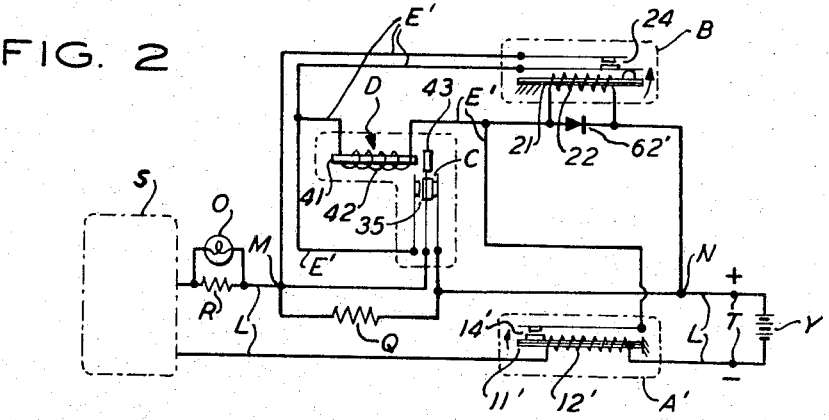
Figure 3:
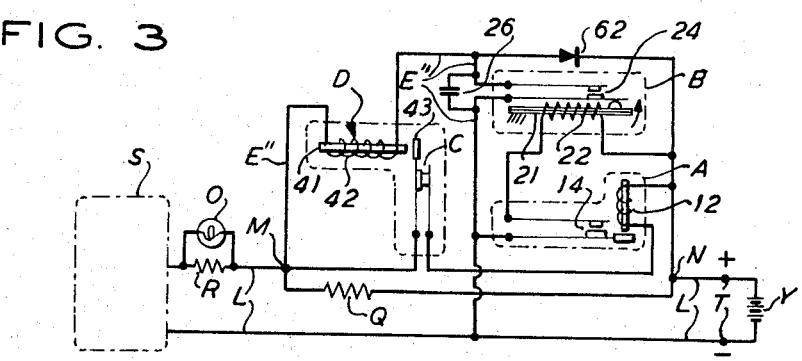

In the more detailed description reference is made to the accompanying drawing, in which FIGURES 1, 2 and 3 are respective schematic diagrams of three specifically different battery chargers in each of which the invention has been embodied in a respective form.

Reference being had to FIGURE 1, there will be seen the terminals T across which a battery, shown as Y, may be connected. There will also be seen a source S of current; purely by way of example that source has been shown as comprising a transformer U whose primary may be connected to an A.C. line (if desired, through an on-off switch W), to a center-tap on whose secondary one conductor of the line L may be connected, and to the extremities of whose secondary the other conductor of the line L may be connected through respective rectifiers V.

In FIGURE 1 there will further be seen a two-conductor line L through which current may flow from source S to the battery Y—a resistor R being serially interposed in the line L to establish that current, in the absence of substantial other resistance in the line, at a value appropriate for the fast charge of the battery. By way of example the lowershown one of the terminals and the lowershown one of the conductors may in each instance be taken as the negative one.

The current-sensing relay above referred to in subparagraph (a) is designated as A. By way of specific example it is shown as an electromagnetic relay. It comprises the abovementioned input circuit 12, typically in the form of a coil preferably of very low or negligible resistance, and an output switch 14 typically in the form of normally open contacts. The input circuit 12 is connected in series with the line L, by way of example in the uppershown one of the two conductors. The output switch 14 is operated (e.g. its contacts are closed) in response to the flow of fast-charge current, but it is de-operated (e.g. those contacts are restored to their normally open condition) when reduced charge current flows, in the line.

The charge-sensing relay above referred to in subparagraph (b) is designated as B. By way of specific example it is shown as a thermal relay, and by way of still more specific example as a thermal relay comprising a motive element in the form of a bi-metallic arm 21 whose leftshown extremity is rigidly secured and whose rightshown extremity moves upwardly in response to heating of the arm by the flow of current through a winding 22 surrounding the arm—the winding 22 forming the input circuit of the relay. That input circuit and the output switch 12 of the current-sensing relay A may in series with each other be wired across the terminals T, so that that input circuit will be connected, under the control of the output switch 14, across those terminals when that output switch is operated. The charge-sensing relay B further comprises its own output switch, typically in the form of contacts 24 operated (e.g. closed), while the input circuit 22 remains connected across the terminals T, in response to a state of completion of fast charge of the battery Y.

The phrase "state of completion of fast charge" is used to denote that state of charge of the battery which it occupies after it has been fast-charged at a selected fast-charge rate for a sufficient time so that it will not accept substantial further charge at that fast-charge rate without undergoing "gassing" of its electrolyte or some other hurtful or undesirable action—the phrase being used to refer to that state broadly, and independently of how the battery has arrived at it. The charge-sensing relay may be one whose output switch is operated in response to a predetermined behavior of the voltage of the battery (i.e. the voltage between its terminals) which is known to be associated with that state. Since charging at a fast-charge rate brings that voltage to a "plateau" at which it tends to remain while fast charge is being beneficially continued but from which it tends to rise appreciably upon the completion of fast charge, the arrival of the voltage of the battery at a value preselected at slightly more than the "plateau" voltage may for example be the predetermined behavior in response to which the output switch 24 is operated. There is not intended, however, any unexpressed limitation of the charge-sensing relay B to one functioning on this particular absolute-voltage basis.

The charge-current-reducing switching device above referred to in subparagraph (c) is designated as C, and may comprise a pair of normally closed contacts. It is connected in series with the line L, for example in the uppershown one of the conductors so that it and the relay input circuit 12 form a very-low-resistance path between the points M and N in that conductor. Between those points there is another path 42–62, of substantial resistance, hereinafter referred to, and a still further path also of substantial resistance may sometimes be advantageously included in the form of a resistor Q, also hereinafter referred to.

When the switching device C is operative (i.e. when its contacts are opened) it reduces the charge current by holding open the low-resistance path C–12 above referred to—it being the presence of the path 42–62, and of the resistor Q if employed, which results in the effect on the charge current being a reduction rather than a complete interruption.

The control means above referred to in subparagraph (d) is designated as D. It may comprise an electromagnet consisting of the abovementioned coil 42 and a magnetic core 41 which that coil surrounds, and an armature 43 to which the switching device C is mechanically coupled (as by the mounting of that armature on the appropriate one of the blades of the device C) attractable by the electromagnet. When the control means is energized by appropriate current through the coil 42 the electromagnet attract and move the armature 43, for example into abutment against the end of the core 41, thereby to render the switching device C operative.

As illustrated and described in the preceding two paragraphs the elements C and D will be recognized as together constituting a form of electromagnetic relay.

The element above referred to in subparagraph (e) is designated as E. It comprises a circuit, controlled by the output switches 24 and 14 of the sensing relays B and A and rendered operative when both those output switches are operated, for energizing the control means D in sufficient degree to render the switching device C operative. As specifically illustrated the circuit E leads from the point M in the uppershown conductor to the leftshown extremity of the coil 42, and from the rightshown extremity of that coil through the output switches 24 and 14 to the lowershown conductor of the line L—the output switch 14 being serially included in the circuit E as well as being in series with the charge-sensing relay's input circuit 22. When rendered operative by a state of closure of both 24 and 14 the specifically illustrated circuit E connects the control means D in effective shunt relationship to the line L, with the result that D will be traversed and energized by a substantial current (equal to the quotient of the line voltage by the modestly-valued resistance of 42) and the switching device C will be rendered operative.

The rendering operative of C will of course reduce the charge current; on the other hand in view of the above-defined characteristics of the element A that reduction of charge current will result in the de-operation of the output switch 14 and thus in the breaking or opening of the circuit E. That opening when it occurs will terminate the substantial current through D; thus the connection of D in effective shunt relationship to the line is only a connection pending the de-operation of one of the output switches—specifically, of the output switch 14. In order to avoid any risk of the two actions initially mentioned in this paragraph stultifying each other it is desirable to choose the parameters of A and D so that the time interval consumed in the de-operation of the output switch 14 is greater than that required for the switching device C to have been rendered fully operative—e.g. for the armature 43 to have come to rest against the end of the core 41.

The connection of the control means D above referred to at the conclusion of the tabulation of elements—i.e. its connection, when the switching device C is and the energizing means E is not operative, in effective series relationship to the line for energization by a component of the reduced charge current—is effected in the control of FIGURE 1 through a diode 62, connected and poled to conduct current from the right shown extremity of the coil 42 to the point N, and forming with the coil 42 the path 42–62 above referred to. Obviously while the switching device C is inoperative (i.e. while fast-charge current continues to flow in the line) the presence of the path 42–62 in parallel with the path C–12 is, in view of the very low resistance of 12, of wholly negligible effect; equally obviously, while the energizing means is operative (i.e. during the brief interval of closure of the circuit E) the junction of 42 and 62 is temporarily established at the potential of the lowershown (e.g. negative) conductor of the line L, so that the diode 62 is reverse-biased and the path 42–62 therefore totally ineffective. But after that brief interval the joint maintenance of C in operative (e.g. open) and of E in inoperative (e.g. open) condition removes the disabilities previously imposed on the path 42–62, and the control means D becomes connected through the diode 62 in effective series relationship to the line L for traversal or energization by a component of the reduced charge current. Thereafter it is the energization of D by that component which maintains the switching device C operative.

In the absence of the resistor Q the reduced charge current will be that established by the substitution in the line L, for the resistance value of R, of a value equal to that of C plus that of R; the component traversing D will then be 100% (i.e. all) of the reduced charge current. If the reduced charge current which would result from that substitution be less than desired, the resistor Q may be included to raise the reduced charge current to the desired value; the component traversing D will then be a fraction only of the reduced charge current.

It has been brought out above that the control means D is energizable by the reduced-charge-current component to maintain the switching device C operative. It is to be noted, however, that to render that device operative in the first place reliance is placed on the energizing means E which, since its function is to render the switching device C operative and thereby to reduce the charge current, does not itself depend on that reduced current. Although no unexpressed limitation thereto is intended, the illustrated use of a circuit connecting the control means D in effective shunt relationship to the line L is a particularly favorable manner of providing that energizing means. With typical circuit parameters, it among other things inherently effects an energization of the control means D substantially greater than the subsequent energization of D by the reduced charge current. This in turn permits that control means to be one whose energization by the reduced charge current, although sufficient to maintain the switching device C operative, would be quite insufficient to render that device operative in the first instance; stated in other words, the control means D, necessarily one which is energizable by the reduced charge current to maintain the switching device C operative, may nevertheless be one requiring substantially greater energization to render that device operative. This for example enables the use of a relatively insensitive electromagnetic relay for C and D, taken together.

In the control system illustrated in FIGURE 1 it is the output switch 24 of the voltage-sensing relay B which by its operation completes the circuit E and thereby renders that circuit operative to energize D (e.g. to place D in effective shunt relationship to the line); on the other hand it is the output switch 14 of the current-sensing relay A which by its subsequent de-operation opens the circuit E to result in D being placed in effective series relationship to the line. At the instant of de-operation of 14, 24 will itself still (although of course ineffectively) remain operated; the disconnection of the associated input circuit 22 from the terminals T which attends de-operation of 14 will, however, result in the de-operation of 24 as well—subject to whatever modest or negligible delay characterizes the action of the voltage-sensing relay B (which in the case of a thermal relay, such as specifically illustrated, may be as great as several seconds).

The description of FIGURE 1 may be completed by noting the presence across resistor R of an indicator lamp O (typically of incandescent variety) whose illumination and non-illuminatioin serve respectively to indicate the flow in the line L of fast-charge current and of reduced charge current, and of the pilot lamp P (also typically of incandescent variety) whose illumination and non-illumination serve to indicate respectively availability and non-availability of power from the source S.

The improved action of a charger equipped with the control system of FIGURE 1 has already been outlined above (in the brief description) and need not be restated. As there brought out not only will there be no load on the battery during any interruption of the supply of power from the source, but also in the event of the removal of the battery from the terminals T none of the elements of the control system will impose any load on the source S; thus from a source of the particular type illustrated, if its transformer T draws negligible no-load current, the illustrated on-off switch T may be omitted as surplusage.

There is intended no unexpressed limitation of the sensing relays to those of the respective types shown. Thus FIGURE 2 by way of example shows a control system wherein the current-sensing relay is of a thermal type; it also by way of example shows the input circuit of that relay connected in the lowershown (e.g. negative), rather than in the uppershown, conductor of the line L. More specifically in FIGURE 2 the current-sensing relay, designated as A', comprises a motive element in the form of a bimetallic arm 11' which is electrically connected with the lowershown conductor, whose rightshown extremity may be mechanically fixed, whose leftshown extremity is movable upwardly under the influence of heat, and which at the latter extremity carries a contact (electrically common with the arm) which when the lefthand extremity has moved appreciably will be closed against a contact thereabove—the two contacts forming the output switch 14' of the relay. The input circuit, designated as 12', may comprise a heating winding surrounding and effective on the bimetallic arm 11', having its rightshown extremity electrically common with that arm, and being itself serially interposed in the lowershown conductor of the line L.

While the substitution of the different and differently positioned current-sensing relay might be a sole change from the control system of FIGURE 1, FIGURE 2 also shows changes in other respects—not, however, extending to the charge-sensing relay B itself, or to the connection of its input circuit 22 which is again arranged in series with the current-sensing relay's output switch across the terminals T, or to the charge-current-reducing switching device C (but which of course now, in view of the re-positioning of the input circuit of the current-sensing relay, forms the only element electrically intervening between points M and N), or to the control means D itself. Now, however, the energizing means is a circuit E' leading, from the point M in the uppershown conductor, first through the output switch 24 of the charge-sensing relay B and thence to the leftshown extremity of the coil 42, and from the rightshown extremity of that coil through the output switch 14' of the current-sensing relay to the lowershown conductor of the line L—the output switch 14' being serially included in the circuit E' as well as being in series with the charge-sensing relay's input circuit 22. When rendered operative by a state of closure of both 24 and 14, the circuit E' (like the circuit E of FIGURE 1) connects the control means D in effective shunt relationship to the line L.

The connection of the control means D in effective series relationship to the line, under the circumstances that the switching device C is and the energizing means E' is not operative, again involves the connection of its rightshown extremity to the point N; in the circuit of FIGURE 2 as thus far described there already inherently exists such a connection through the charge-sensing relay's input circuit 22, but as this is typically of substantial resistance it is usually desirable to shunt across it a diode 62' poled for the conduction of current from 42 to N. In FIGURE 2 that connection of the control means D under the stated circumstances further requires a means which will then connect its leftshown extremity to the point M independently of the output switch 24 (which, as in the control system of FIGURE 1, is destined to become de-operated or opened shortly after the charge current is reduced); such a means may be provided in the form of a switch 35 which is connected in parallel with the output switch 24 and which is closed (for example by the control means D) whenever the charge-current-reducing switching device C is operative.

Basically the system of FIGURE 2 operates similarly to that of FIGURE 1. There is, however, one functional distinction: that the dependence on the closed state of the charge-sensing relay's output switch 24 for the flow of the energizing current which renders the switching device C operative is limited, by the switch 35 which shunts 24, to the typically minute interval between the closure of 24 and the rendering operative of C (which closes 35), in contrast to the longer interval, between the closure of 24 and the opening of 14, during which such current flows in the system of FIGURE 1. The minimization of that interval of dependence on 24 is sometimes advantageous—e.g. when the charge-sensing relay is (as illustrated) of an electromechanical nature and is used in an environment wherein there might be imposed on the system mechanical shocks which could unintendedly jar 24 open since the breaking of substantial current by the output switch of such a charge-sensing relay is frequently considered undesirable. The system of FIGURE 2 not only minimizes that interval, but even obviates 24 being called on to break the small current which results in FIGURE 1 from the impression of about 0.7 volt (the drop across diode 62) across the input circuit 22 just prior to the opening of 24.

In cases wherein the breaking of substantial current by 24 is not an occasion for concern, the system of FIGURE 1 may if desired be modified as shown in FIGURE 3. The change from FIGURE 1 is the replacement of the energizing circuit E, which serially included both output switches 24 and 14, by a circuit E″ from which the switch 14 is absent. The circuit E″ is of course still controlled by both 24 and 14, since 14 is still required to be closed in order to energize the input circuit 22 (without which energization 24 cannot operate), and again it is rendered operative to energize the switching device C in response to a state of operation of both those output switches 24 and 14; now, however, the placing of control means D in effective series relationship to the line is not immediately effected by the opening of the output switch 14, but instead is effected by the opening of the output switch 24 which results, with some delay, from the opening of 14. Thus the energizing means E″ is a means for energizing the control means D pending the de-operation of the output switch of the charge-sensing relay B—in distinction to E and E′ of the respective earlier figures, each of which is a means for energizing the control means pending the de-operation of the output switch of the current-sensing relay A. With this arrangement the use of a capacitor 26 across the output switch 24 is usually desirable.

In the several embodiments no unexpressed limitations are intended as to the nature of the several relays, each of which may take any of a wide variety of forms and is not necessarily limited to a unitary device.

In connection with each of the illustrated embodiments of the invention it has been seen that excepting during the flow of fast-charge current in the line L the current-sensing relay A disconnects the input circuit 22 of the charge-sensing relay B from across the terminals T. That current-sensing relay A accordingly constitutes a means for rendering the charge-sensing relay B ineffective during the flow of reduced or no current in the line L, and it is so referred to in certain of the appended claims.

While I have illustrated and described my invention in terms of particular embodiments thereof, I intend thereby no unnecessary limitations. Modifications in many respects will be suggested by my disclosure to those skilled in the art, and such modifications will not necessarily constitute departures from the spirit of the invention or from the scope, which I undertake to define in the following claims.

I claim:
1. In a battery charger the combination, with a pair of terminals across which a battery may be connected and a two-conductor line through which fast-charge current may flow from a source to a battery present across said terminals, of a charge-sensing relay having an input circuit connected with said line and having an output switch operated in response to a state of completion of fast charge of a battery present across said terminals; a charge-current-reducing switching device connected with said line; control means for said switching device energizable to render and to maintain that device operative; means controlled by, and rendered operative in response to a state of operation of, said output switch for energizing said control means to render said switching device operative, said control means when said switching device is and said energizing means is not operative being connected in effective series relationship to said line for energization by a component of the reduced charge current thereby to maintain said switching device operative; and means rendering said charge-sensing relay ineffective during the flow of reduced or no charge current in said line.

2. The subject matter claimed in claim 1 wherein said control means is energizable by a component of the reduced charge current to maintain said switching device operative but requires substantially greater energization to render that device operative, and wherein said energizing means comprises means for effecting said substantially greater energization of said control means.

3. The subject matter claimed in claim 1 wherein said energizing means comprises means for connecting said control means in effective shunt relationship to said line.

4. The subject matter claimed in claim 1 wherein said output switch operated in response to a state of completion of fast charge of the battery is an output switch operated in response to a predetermined behavior of the voltage of the battery.

5. The subject matter claimed in claim 4 wherein said predetermined behavior of the voltage of the battery is the arrival of that voltage at a preselected value.

6. The subject matter claimed in claim 1 wherein said energizing means is a means for energizing said control means pending the de-operation of the output switch of one of said sensing relays.

7. The subject matter claimed in claim 6 wherein said one sensing relay is said current-sensing relay.

8. The subject matter claimed in claim 7 wherein the time interval consumed in the de-operation of said current-sensing relay is greater than the time interval required for said switching device to be rendered operative.

9. The subject matter claimed in claim 6 wherein said one sensing relay is said voltage-sensing relay.

10. The subject matter claimed in claim 1 further including a diode through which there is effected said connection of the control means, when said switching device is and said energizing means is not operative, in effective series relationship with said line.

11. In a battery charger the combination, with a pair of terminals across which a battery may be connected and a two-conductor line through which fast-charge current may flow from a source to a battery present across said terminals, of a current-sensing relay having an input circuit connected in effective series relationship to said line and having an output switch operated in response to the fast-charge current, and de-operated when reduced charge current, flows in said line, a charge-sensing relay having an input circuit connected, under the control of the output switch of said current-sensing relay, across said terminals when that switch is operated and itself having an output switch operated, while its input circuit remains so connected, in response to a state of completion of fast charge of a battery present across said terminals, a charge-current-reducing switching device connected with said line, control means for said switching device, energizable to render and to maintain that device operative, and means, controlled by the output switches of both said sensing relays and rendered operative in response to a state of operation of both of them, for energizing said control means to render said switching device operative, said control means, when said switching device is and said energizing means is not operative, being connected in effective series relationship to said line for energization by a component of the reduced charge current thereby to maintain said switching device operative.

References Cited

UNITED STATES PATENTS

| | | | |
|---|---|---|---|
| 2,013,618 | 9/1935 | Woodbridge | 320—40 |
| 2,262,845 | 11/1941 | Hartley et al. | 320—23 |
| 2,509,252 | 5/1950 | Salazar | 320—23 |

JOHN F. COUCH, *Primary Examiner.*

S. WEINBERG, *Assistant Examiner.*